US010578895B2

(12) United States Patent
Ikeno

(10) Patent No.: US 10,578,895 B2
(45) Date of Patent: Mar. 3, 2020

(54) LIGHT RAY DIRECTION CONTROLLING DEVICE AND DISPLAY DEVICE

(71) Applicant: Tianma Japan, Ltd., Kanagawa (JP)

(72) Inventor: Hidenori Ikeno, Kanagawa (JP)

(73) Assignee: TIANMA JAPAN, LTD., Kawasaki (JP)

( * ) Notice: Subject to any disclaimer, the term of this patent is extended or adjusted under 35 U.S.C. 154(b) by 0 days.

(21) Appl. No.: 16/203,659

(22) Filed: Nov. 29, 2018

(65) Prior Publication Data

US 2019/0163020 A1 May 30, 2019

(30) Foreign Application Priority Data

Nov. 29, 2017 (JP) .................................. 2017-229129

(51) Int. Cl.
*G02F 1/13* (2006.01)
*G02F 1/167* (2019.01)
*G09G 3/36* (2006.01)
*G02F 1/1347* (2006.01)
*G02F 1/1334* (2006.01)
*G02F 1/1335* (2006.01)

(52) U.S. Cl.
CPC .......... *G02F 1/1323* (2013.01); *G02F 1/1334* (2013.01); *G02F 1/13476* (2013.01); *G02F 1/133606* (2013.01); *G02F 1/167* (2013.01); *G09G 3/3648* (2013.01); *G09G 2320/028* (2013.01); *G09G 2320/068* (2013.01)

(58) Field of Classification Search
CPC ............. G02F 1/133606; G02F 1/1334; G02F 1/13476; G02F 1/1323; G02F 1/167; G02F 2201/44; G09G 3/3648; G09G 2320/028; G09G 2320/068
See application file for complete search history.

(56) References Cited

U.S. PATENT DOCUMENTS

| 9,030,381 B2* | 5/2015 | Cho ......................... G09G 5/10 345/6 |
| 10,247,982 B2* | 4/2019 | Choi ..................... G02F 1/1323 |
| 2007/0176887 A1 | 8/2007 | Uehara et al. |
| 2008/0088905 A1* | 4/2008 | Mimura ............ G02F 1/133524 359/227 |
| 2009/0102990 A1* | 4/2009 | Walton .................. G02F 1/1323 349/15 |

(Continued)

FOREIGN PATENT DOCUMENTS

| JP | 2007-206373 A | 8/2007 |
| JP | 2013-50740 A | 3/2013 |
| JP | 2016-62092 A | 4/2016 |

*Primary Examiner* — Darlene M Ritchie
(74) *Attorney, Agent, or Firm* — Young & Thompson

(57) ABSTRACT

A light ray direction controlling device includes: a plurality of louver elements switching between a transparent state and a light absorption state in accordance with an applied voltage, and a plurality of polymer dispersed liquid crystal parts arranged along the primary surface of the substrate between the plurality of louver elements, respectively. The polymer dispersed liquid crystal parts each includes a solid polymer resin part and liquid crystal drops dispersed in the solid polymer resin part. The polymer dispersed liquid crystal parts each changes a degree of scattering of exiting light by changing a degree of scattering of incident light in accordance with an applied voltage.

11 Claims, 10 Drawing Sheets

(56) References Cited

U.S. PATENT DOCUMENTS

| | | | |
|---|---|---|---|
| 2013/0082986 A1* | 4/2013 | Yamauchi | G02F 1/1334 |
| | | | 345/204 |
| 2014/0232960 A1* | 8/2014 | Schwartz | G02B 26/004 |
| | | | 349/12 |
| 2015/0323841 A1* | 11/2015 | Matsushima | G02F 1/134336 |
| | | | 349/33 |
| 2016/0077364 A1 | 3/2016 | Shiota | |
| 2016/0091726 A1* | 3/2016 | Yoon | G02B 27/26 |
| | | | 349/15 |
| 2017/0219859 A1* | 8/2017 | Christophy | G02F 1/1323 |
| 2017/0256210 A1* | 9/2017 | Kato | G09G 3/342 |
| 2018/0252949 A1* | 9/2018 | Klippstein | B32B 3/085 |

\* cited by examiner

LIGHT RAY DIRECTION CONTROLLING DEVICE AND DISPLAY DEVICE

CROSS-REFERENCE TO RELATED APPLICATIONS

This Non-provisional application claims priority under 35 U.S.C. § 119(a) on Patent Application No. 2017-229129 filed in Japan on Nov. 29, 2017, the entire content of which is hereby incorporated by reference.

BACKGROUND

The present disclosure relates to a light ray direction controlling device and a display device.

With display devices being smaller, lighter, and more highly-defined and the widespread of wireless network that enables users to connect to information from anywhere, it has become possible to process various types of information via smartphones, tablets, or laptop computers regardless of time and place. However, although being able to handle various types of information from anywhere makes people's life more convenient, accessing information in places where the users are surrounded by many other people such as restaurants, parks, or trains and buses creates the risk of information leak.

To solve this problem, a viewing angle controlling film has been used. The viewing angle controlling film is configured to absorb light that is output toward the diagonal direction so that the screen can be viewed only from the front side, thereby mitigating the risk of information leak. However, when this film is used, the viewing angle is constantly narrow, and therefore, in order to perform another task that requires a display with wide viewing angle, the viewing angle controlling film needs to be physically removed.

As opposed to a louver with a fixed viewing angle that needs to be removed physically, a means to switch between the wide viewing angle mode and the narrow viewing angle mode by electrical control has been developed. For example, Japanese Patent Application Laid-open Publication No. 2013-50740 discloses a configuration where a louver with a fixed viewing angle and an element that can switch between the light scattering state and transparent state electrically, such as a PDLC (polymer dispersed liquid crystal), are stacked.

Japanese Patent Application Laid-open Publication No. 2016-62092 discloses an active louver that includes electrophoretic elements. The active louver switches between the light absorption state and transparent state by changing the driving voltage of the electrophoretic element. This makes it possible for the display device to switch between the narrow viewing angle mode and the wide viewing angle mode. Japanese Patent Application Laid-open Publication No. 2007-206373 discloses an active louver that uses PDLC. By switching between the light scattering state and the transparent state of the PDLC, the display device can switch between the narrow viewing angle mode and the wide viewing angle mode.

SUMMARY

The technology disclosed in Japanese Patent Application Laid-open Publication No. 2013-50740 is to absorb part of light emitted from the backlight with a louver and then cause the remaining light to scatter using another optical element in the wide viewing angle mode. This worsens the light utilization efficiency for the wide viewing angle mode. Also, the luminance in the front direction differs between the wide viewing angle mode and the narrow viewing angle mode.

In the technology disclosed in Japanese Patent Application Laid-open Publication No. 2016-62092, the viewing angle of the wide viewing angle mode is determined by the light from the backlight. With this configuration, it is not possible to achieve a wider viewing angle than the viewing angle determined by the spread angle of the light from the backlight. If the spread angle of the light from the backlight is made larger, the amount of light absorbed by the active louver in the narrow viewing angle mode increases, which lowers the light utilization efficiency and generates more heat.

In the device disclosed in Japanese Patent Application Laid-open Publication No. 2007-206373, the viewing angle can be made smaller or greater than the viewing angle determined by the spread angle of the light from the backlight. However, it is not possible to switch between the greater viewing angle and the smaller viewing angle than the viewing angle determined by the spread angle of the backlight in one device.

An aspect of the present disclosure is a light ray direction controlling device that can change a range of an emission angle of light that is incident on a light incident surface and exits from a light exiting surface. The light ray direction controlling device includes a substrate; a plurality of louver elements arranged along a primary surface of the substrate, the louver elements each rising up in a direction from the light incident surface toward the light exiting surface, the louver elements each extending along the primary surface of the substrate and switching between a transparent state and a light absorption state in accordance with an applied voltage; a plurality of polymer dispersed liquid crystal parts arranged along the primary surface of the substrate between the plurality of louver elements, respectively, the polymer dispersed liquid crystal parts each including a solid polymer resin part and liquid crystal drops dispersed in the solid polymer resin part, the polymer dispersed liquid crystal parts each changing a degree of scattering of exiting light by changing a degree of scattering of incident light in accordance with an applied voltage; a plurality of pairs of polymer dispersed liquid crystal part driving electrodes each arranged so as to sandwich one of the polymer dispersed liquid crystal parts and giving a driving voltage to the sandwiched one of the polymer dispersed liquid crystal parts; and a plurality of pairs of louver element driving electrodes each arranged so as to sandwich one of the plurality of louver elements and giving a driving voltage to the sandwiched one of the plurality of louver elements.

It is to be understood that both the foregoing general description and the following detailed description are exemplary and explanatory and are not restrictive of this disclosure.

DETAILED DESCRIPTION OF THE EMBODIMENTS

Hereinafter, embodiments of present disclosure will be described with reference to the accompanying drawings. It should be noted that the embodiments are merely examples to implement present disclosure and are not to limit the technical scope of present disclosure. Elements common to the drawings are denoted by the same reference signs.

A light ray direction controlling device according to one embodiment of the present disclosure includes a light absorption element that can switch between the transparent state and the light absorption state in accordance with the driving voltage, and a light scattering element that can switch between the transparent state and the light scattering state in accordance with the driving voltage. The light ray direction controlling device controls the light absorption element and the light scattering element independently of each other.

With the light ray direction controlling device of the present disclosure, it is possible to achieve a display device having three modes: the standard viewing angle mode determined by the spread angle of the light from the backlight; a wide viewing angle mode in which the viewing angle is greater than the standard viewing angle; and a narrow viewing angle mode in which the viewing angle is smaller than the standard viewing angle.

One example of the light absorption element is an active louver (will also be referred to as a louver) that controls the arrangement of colored electrophoretic particles in a dispersion medium with a driving voltage. One example of the light scattering element is the PDLC (polymer dispersed liquid crystal) element. Below, a light ray direction controlling device including a louver and a PDLC part will be explained, the louver containing a dispersion medium and colored electrophoretic particles.

Embodiment 1

Configuration

Figure 1A:
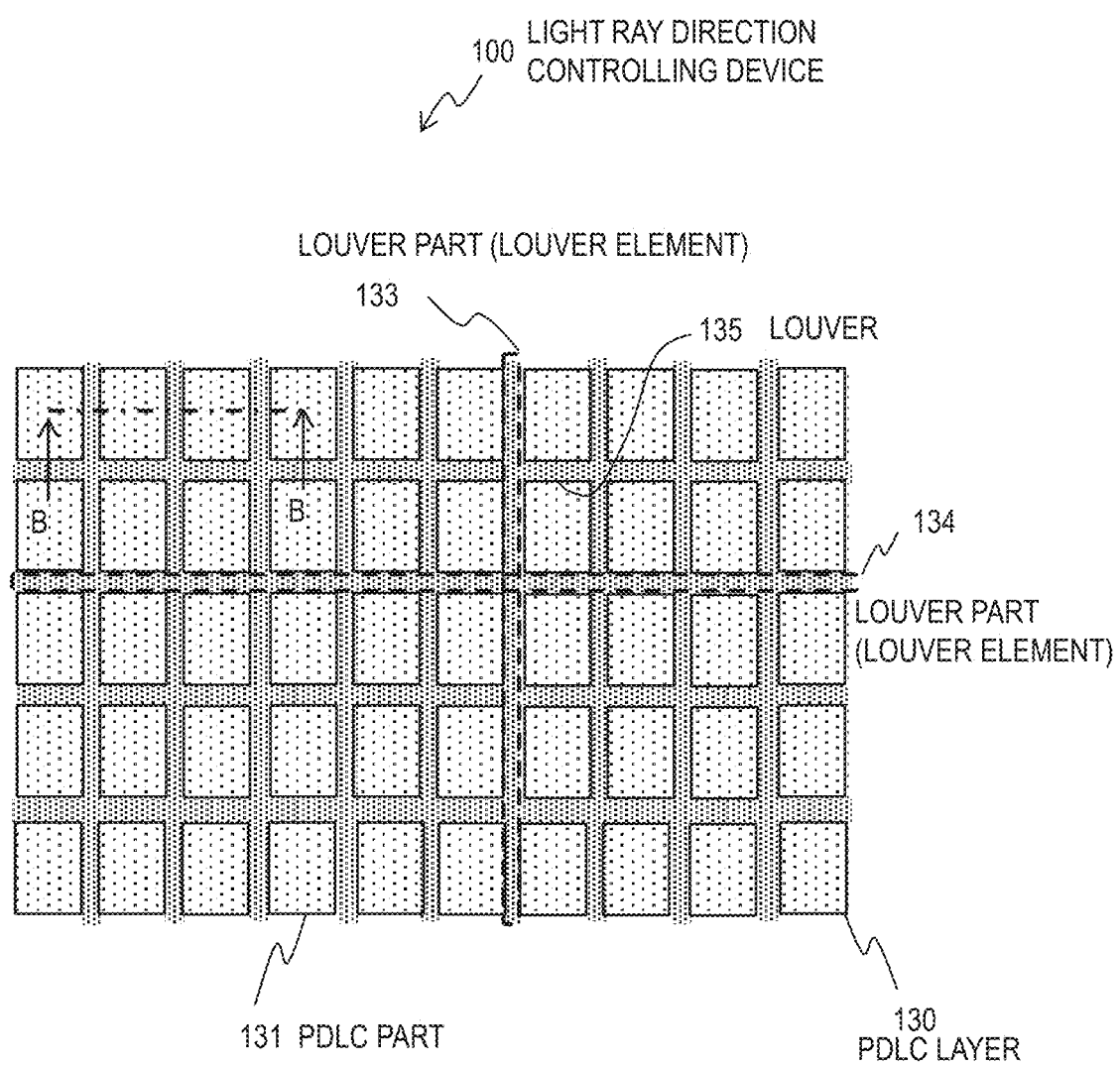
FIG. 1A is a plan view illustrating the configuration of a part of the light ray direction controlling device of this embodiment.

FIG. 1A is a plan view illustrating the configuration of a part of the light ray direction controlling device 100 of this embodiment. The light ray direction controlling device 100 includes a louver 135 having a grid-like shape in a plan view, and a plurality of PDLC parts 131 arranged in the respective spaces defined by the louver 135. In the example of FIG. 1A, only one of the plurality of PDLC parts is denoted with the reference character 131. The PDLC layer 130 includes a plurality of PDLC parts 131. The louver 135 and the PDLC layer 130 are formed on a substrate (not illustrated in FIG. 1A).

The louver 135 includes a plurality of parts arranged on the substrate primary surface. Each of those parts is referred to as a louver element or a louver part. The louver 135 may be constituted of a plurality of separated louver elements, or may be constituted of a plurality of connected louver elements.

In the example of FIG. 1A, the louver 135 includes a plurality of louver elements (louver parts) 133 that extend in the vertical direction (column direction) along the primary surface of the substrate, and a plurality of louver elements (louver parts) 134 that extend in the horizontal direction (row direction). The vertical direction and the horizontal direction are perpendicular to each other. In the example of FIG. 1A, one of the louver parts in the vertical direction is denoted with the reference character 133, and one of the louver parts in the horizontal direction is denoted with the reference character 134.

The shape of the louver elements (louver parts) 133, 134 are affected by the shape of the PDLC parts 131. In the example of FIG. 1A, each PDLC part 131 is an independent rectangle, and the louver elements (louver parts) 133 and 134 are connected to each other, forming the louver 135 of a grid-like shape. If the louver 135 has a stripe shape extending in the horizontal direction or vertical direction, the louver 135 can be constituted of a plurality of separated louver elements (louver parts).

The respective louver elements 133 extending in the vertical direction intersect with the plurality of louver elements 134 extending in the horizontal direction, and are connected to the plurality of louver elements 134 at the respective intersections. Similarly, the respective louver elements 134 extending in the horizontal direction intersect with the plurality of louver elements 133 extending in the vertical direction, and are connected to the plurality of louver elements 133 at the respective intersections.

The louver 135 can take any pattern as long as it can control the viewing angle. For example, the louver 135 may have a stripe pattern. In the example of FIG. 1A, the louver 135 may omit the plurality of louver elements 133 and be constituted of the plurality of louver elements 134 only, or may omit the plurality of louver elements 134 and be constituted of the plurality of louver elements 133 only.

The pitch of the louver elements 133 or the pitch of the louver elements 134 may be even or vary. The louver elements 133 or 134 do not have to be linearly formed. For example, the louver elements 133 or 134 may extend in the vertical direction or horizontal direction while repeatedly zigzagging.

The plurality of PDLC parts 131 are arranged so as to fill the gap between the respective louver elements. In other words, the louver 135 (louver elements 133, 134) are arranged so as to fill the gap between the respective PDLC parts 131. The PDLC parts 131 have the same rectangular shape, but may have different shapes in accordance with the pattern of the louver 135. For example, the shape of the PDLC parts 131 may be a square, diamond, circle, or oval, depending on the optical characteristics.

Figure 1B:
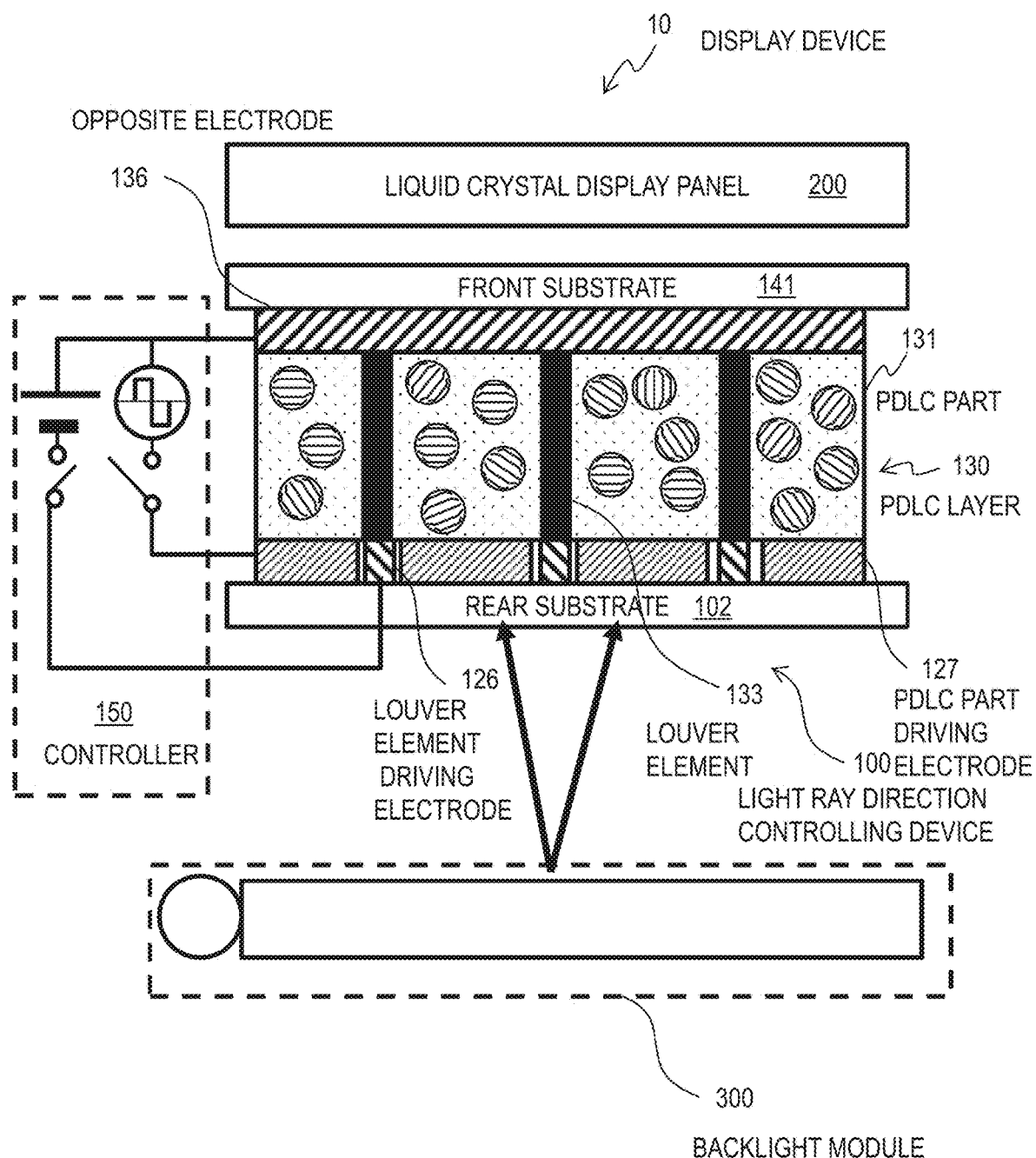
FIG. 1B schematically illustrates the cross-sectional structure of the display device including the light ray direction controlling device.

FIG. 1B schematically illustrates the cross-sectional structure of the display device 10 including the light ray direction controlling device 100. The display device 10 includes a backlight module 300, a liquid crystal display panel 200, and a light ray direction controlling device 100 disposed between the backlight module 300 and the liquid crystal display panel 200. The structure including the backlight module 300 and the light ray direction controlling device 100 may also be referred to as a backlight unit. It is possible to dispose the light ray direction controlling device 100 on the top surface (viewer's side) of the liquid crystal display panel 200, but this may cause images to be blurry in the wide viewing angle mode.

In the descriptions below, the side of a user who views images displayed by the liquid crystal display panel 200 is referred to as the front side, and the side opposite thereto is referred to as the back side or rear side. In FIG. 1B, the light ray direction controlling device 100 is disposed on the back side (rear side) of the liquid crystal display panel 200, and on the front side of the backlight module 300.

The display device 10 further includes a controller 150. The controller 150 controls other components in the display device 10. In this embodiment in particular, the controller 150 includes a circuit that controls the light ray direction controlling device 100. Specifically, the controller 150 includes a circuit that drives the louver 135 and a driving circuit that drives the PDLC parts 131. A configuration including those driving circuits in addition to the louver 135 and the PDLC parts 131 may be referred to as the light ray direction controlling device.

The backlight module 300 is a planar light source device that emits focused planner light. The backlight module 300 includes a light source and a plurality of optical plates such as a diffusion plate. The backlight module 300 may be either the edge-lit backlight module or the direct-lit backlight module.

The edge-lit backlight module generally includes a light guide plate, a diffusion plate, and a light-concentrating plate, which are stacked, and a plurality of LEDs (light emitting diodes) disposed so as to face the side face of the light guide plate. The direct-lit backlight module generally includes a plurality of LEDs arranged so as to face the primary surface of the liquid crystal display panel 200, and a diffusion plate and a light-concentrating plate, which are stacked and disposed in front of the LEDs. The light-concentrating plate can be omitted in the direct-lit backlight module. The light source of the backlight module is not limited to LEDs, and fluorescent light (cold-cathode tube or hot-cathode tube), EL elements (organic EL or inorganic EL), and the like may be used.

The liquid crystal display panel 200 may be either the lateral electric field controlling liquid crystal display panel, or the vertical electric field controlling liquid crystal display panel. Examples of the lateral electric field controlling liquid crystal display panel include the IPS (in-plane switching) type and the FFS (fringe-field switching) type. Examples of the vertical electric field controlling liquid crystal display panel include TN (twisted nematic) type and the VA (vertical alignment) type.

The liquid crystal display panel 200 generally includes a TFT (thin film transistor) substrate, and a color filter (CF) substrate facing the TFT substrate. A liquid crystal layer is sandwiched between the TFT substrate and the CF substrate. Each of the TFT substrate and the CF substrate is an insulating transparent substrate made of glass or resin. The TFT substrate and the CF substrate are in a rectangular shape, for example, and one primary surface of one substrate faces one primary surface of the other substrate. The TFT substrate and CF substrate are inflexible or flexible.

Each of the TFT substrate and the CF substrate has a polarizing plate disposed on the primary surface opposite to the side facing the liquid crystal layer. The TFT substrate has liquid crystal driving electrodes and an opposite electrode arranged on the primary surface that faces the liquid crystal layer. The opposing electrode may be formed on the primary surface of the CF substrate facing the TFT substrate.

The liquid crystal display panel 200 is configured to display images by controlling the transmission of light emitted by the back-light module 300 and entering from the rear surface via the light ray direction controlling device 100. Each pair of a liquid crystal driving electrode and the opposite electrode gives an electric field to the liquid crystal of one pixel. The amount of transmission light in each pixel changes depending on the given electric field. The TFT substrate has formed therein a TFT array (not illustrated in the figure) to select pixels to be controlled. The controller 150 controls the TFT array, the liquid crystal driving electrodes and the opposite electrode in accordance with the image data to display images on the liquid crystal display panel 200.

The cross-sectional structure of the light ray direction controlling device 100 illustrated in FIG. 1B is taken along the BB line in FIG. 1A. The light ray direction controlling device 100 includes a front substrate 141 and a rear substrate 102. Each of the front substrate 141 and the rear substrate 102 is an insulating transparent substrate made of glass or resin.

The front substrate 141 and the rear substrate 102 are each in a rectangular shape, for example, and the rear surface of the front substrate 141 faces the front surface of the rear substrate 102. The front substrate 141 and the rear substrate 102 are inflexible or flexible. The rear-side primary surface of the rear substrate 102 is a light incident surface through which the light from the backlight module 300 enters. The front-side primary surface of the front substrate 141 is a light exiting surface through which the light from the backlight module 300 exits.

The PDLC layer 130 is sandwiched by the respective primary surfaces (will also be referred to substrate primary surfaces) of the front substrate 141 and the rear substrate 102 facing each other. The PDLC layer 130 is constituted of a plurality of PDLC parts 131 arranged along the substrate primary surface. The PDLC layer 130 rises in the thickness direction (the vertical direction in FIG. 1B), and has a prescribed pattern as described with reference to FIG. 1A.

In the configuration example of FIG. 1B, the louver elements 133 are disposed (formed) so as to run through the PDLC layer 130. The louver elements 133 rise in the direction from the light incident surface toward the light exiting surface (thickness direction), and has the same height as the PDLC layer 130. For example, the height of the louver elements 133 is 3 μm to 300 μm, the width is 0.25 μm to 40 μm, and the pitch is 1 μm to 200 μm.

The same applies to the louver elements 134, and as illustrated in FIG. 1A, the louver 135 has the prescribed pattern along the primary surface of the substrate. The louver 135 is present in the same layer region as the PDLC layer 130. This makes it possible to reduce the thickness of the light ray direction controlling device 100 and improve the manufacturing efficiency.

A plurality of louver element driving electrodes 126 are formed on the front-side primary surface of the rear substrate 102. The louver element driving electrodes 126 are configured to give driving voltages to the corresponding louver elements 133. Each of the louver element driving electrodes 126 faces a corresponding louver element 133, but does not face any PDLC part 131. The louver element driving electrodes 126 are formed outside of the surfaces of the PDLC parts 131 so as to avoid the PDLC parts 131. This makes it possible to prevent the louver driving potential from affecting the PDLC parts 131.

The same applies to the louver element driving electrodes for the louver elements 134. The louver element driving electrodes of the louver elements 133 and 134 are each a part of a louver electrode that is a continuous metal layer having the same pattern (such as a grid-like pattern) as the louver 135, for example. The louver element driving electrodes are formed of a transparent conductor such as ITO or ZnO, or a light-shielding metal such as Mo or Al, for example.

A plurality of PDLC part driving electrodes 127 are formed on the front-side primary surface of the rear substrate 102. The PDLC part driving electrodes 127 are configured to give driving voltages to the corresponding PDLC parts 131. Each of the PDLC part driving electrodes 127 faces a corresponding PDLC part 131, but does not face the louver 135. The PDLC part driving electrodes 127 are formed outside of the surfaces of the louver 135 so as to avoid the louver 135. The PDLC part driving electrodes 127 are formed of a transparent conductor such as ITO or ZnO, for example.

In the example of FIG. 1B, the PDLC part driving electrodes 127 have the same pattern as that of the PDLC parts 131. The thickness (height) of the PDLC part driving electrodes 127 is the same as that of the louver driving electrode, and those electrodes are disposed in the same region in the layer. The PDLC part driving electrodes 127 are separated from the louver driving electrode, and an insulating layer is formed between those electrodes.

If the louver driving electrode is formed in a grid-like shape, the PDLC part driving electrodes 127 are formed in an island shape, and surrounded by the louver driving electrode. Below the PDLC part driving electrodes 127 and the louver driving electrode, for example, a metal layer is formed with an insulating layer interposed therebetween. The PDLC part driving electrodes 127 are each connected to the metal layer through a via, which establishes the electrical connection of the PDLC part driving electrodes 127. If the louver driving electrode has a stripe pattern (comb shape), the PDLC part driving electrodes 127 are connected to each other in the same layer outside of the PDLC layer 130, for example.

The opposite electrode 136 is formed on the primary surface of the front substrate 141 facing the rear substrate 102. In the example of FIG. 1B, the opposite electrode 136 is one continuous transparent metal layer, for example. The opposite electrode 136 is a transparent electrode formed of ITO or ZnO, for example.

Each PDLC part 131 is sandwiched by the corresponding PDLC part driving electrode 127 and the opposite electrode 136 in the thickness direction. A part of the opposite electrode 136 that faces the PDLC part 131 is the other driving electrode of the pair of driving electrodes for the PDLC part 131.

Each louver element 133 is sandwiched by the corresponding louver element driving electrode 126 and the opposite electrode 136 in the thickness direction. A part of the opposite electrode 136 that faces the louver element 133 is the other driving electrode of the pair of driving electrodes for the louver element 133. The same applied to the louver elements 134.

Respective different parts of one opposite electrode 136 function as the driving electrode for the louver 135 and the driving electrode for the PDLC layer 130, which allows for a reduction in layer number and wiring number, a reduction in thickness of the light ray direction controlling device 100, and improvement in manufacturing efficiency. In FIG. 1B, the rear substrate 102 is arranged on the side closer to the backlight module 300, and the front substrate 141 is arranged on the side closer to the liquid crystal display panel 200, but the present disclosure is not limited to this, and may be configured such that the rear substrate 102 is arranged on the side closer to the liquid crystal display panel 200 and the front substrate 141 is arranged on the side closer to the backlight module 300.

Operation

The controller 150 drives the louver 135 with a DC voltage, and drives the PDLC layer 130 with an AC voltage. The controller 150 gives a constant potential (reference potential) such as a ground potential to the opposite electrode 136. The controller 150 gives a constant potential of a different level to the louver element driving electrodes depending on the viewing angle mode of the display device 10.

The controller 150 gives a reference potential or an AC potential with respect to the reference potential to the PDLC part driving electrodes 127 depending on the viewing angle mode of the display device 10. The waveform of the AC signal is a rectangular wave or sine wave, for example.

As described above, the PDLC layer 130 is driven by AC electric field (AC voltage), and the louver 135 is driven by DC electric field (DC voltage). The louver 135 does not react to the AC electric field due to the response time. Thus, it is possible to drive the louver 135 and the PDLC layer 130 independently of each other.

Figure 2A:
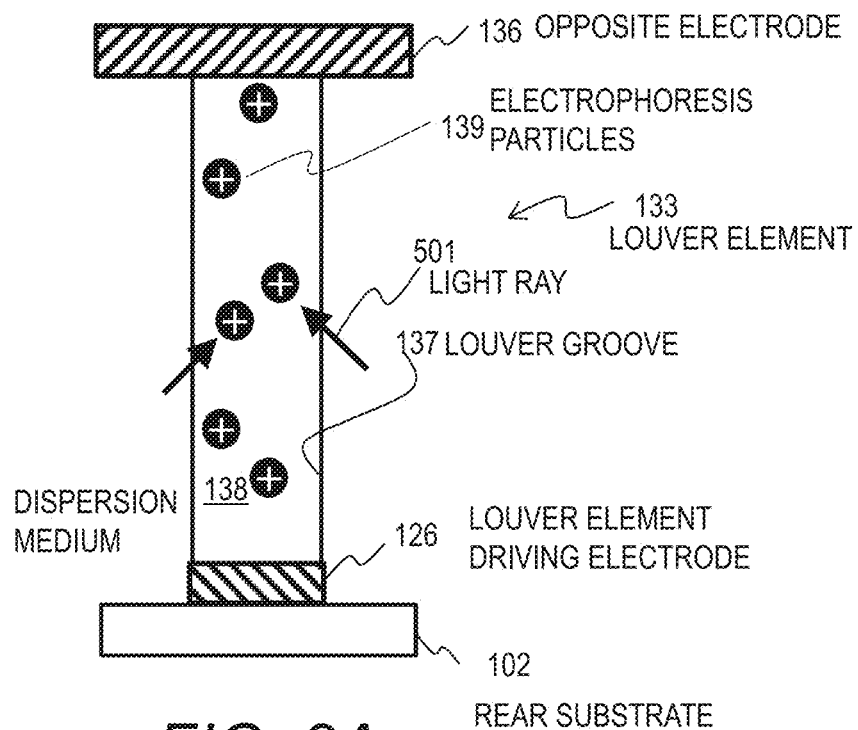
FIG. 2A schematically illustrates the louver element in the light absorption state.
Figure 2B:
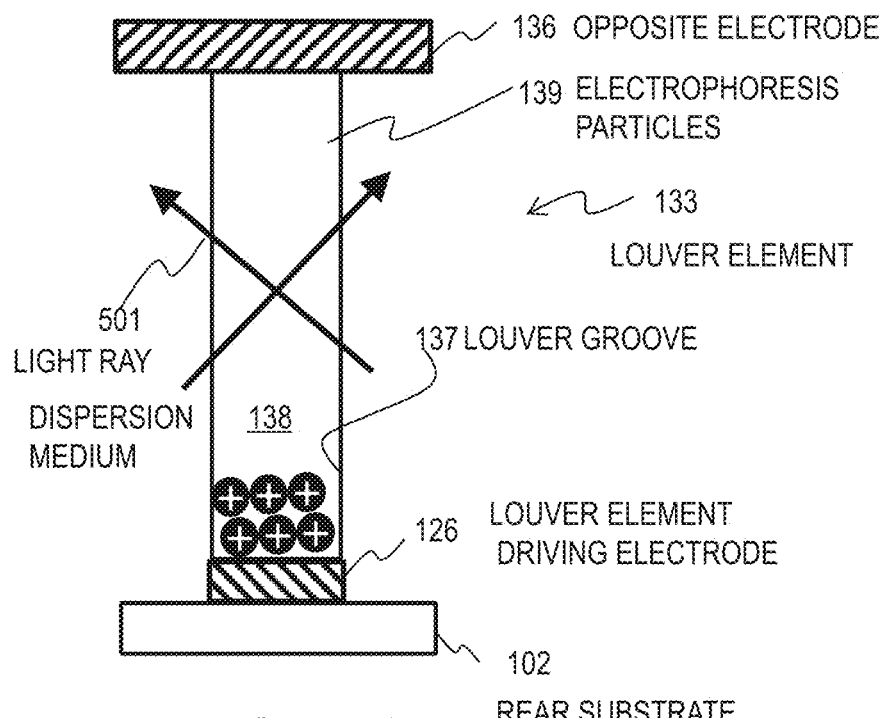
FIG. 2B schematically illustrates the louver element in the transparent state.

FIG. 2A schematically illustrates the louver element 133 in the light absorption state. FIG. 2B schematically illustrates the louver element 133 in the transparent state. The louver element 133 includes electrophoretic particles 139 and a dispersion medium 138 contained in a louver groove 137 (space) formed in the PDLC layer 130.

The electrophoretic particles 139 are colored, and are black fine particles such as carbon black, for example. The dispersion medium 138 is formed of a clear liquid material. The louver 135 adjusts the range of the light transmission direction by changing the arrangement of the colored electrophoretic particles (colored charged particles) 139 in the dispersion medium 138. The electrophoretic particles 139 are positively or negatively charged, and in the example of FIG. 2A, the electrophoretic particles 139 are positively charged.

Each louver element 133 is sandwiched by a louver element driving electrode 126 and the opposite electrode 136. In the example of FIGS. 2A and 2B, the louver element driving electrode 126 and the opposite electrode 136 make contact with the electrophoretic element material made of the electrophoretic particles 139 and the dispersion medium 138. An insulating layer may be formed between each of those electrodes 126, 136 and the electrophoretic element material. The insulating layer is made of silicon oxide or silicon nitride, for example.

With reference to FIG. 2A, in the light absorption state, the electrophoretic particles 139 in the louver element 133 are evenly dispersed in the dispersion medium 138. Because the dispersed electrophoretic particles 139 absorb light, the louver element 133 blocks the incident light ray 501. Thus, only the light ray 501 of a narrow range of emission angle can pass through the louver 135.

In the light absorption state, the louver element driving electrode 126 and the opposite electrode 136 sandwiching the louver element 133 are maintained at substantially the same potential (no voltage). Therefore, the electrophoretic particles 139, which are charged with the same polarity, are pulled apart from each other and dispersed within the dispersion medium 138, and the electrophoretic particles 139 remain evenly dispersed in the dispersion medium 138.

As illustrated in FIG. 2B, the transparent state is realized by making the electrophoretic particles 139 concentrated near one of the electrodes sandwiching the louver element 133. In the example of FIG. 2B, the electrophoretic particles 139 are concentrated near the louver element driving electrode 126. A large part of the louver element 133 only includes the transparent dispersion medium 138, which makes the louver element 133 transparent. Thus, the light ray 501 of a wide range of emission angle can pass through the louver 135.

In the example of FIG. 2B, the relative potential of the louver element driving electrode 126 with respect to the opposite electrode 136 has the polarity opposing to the electrical charge of the electrophoretic particles 139 (potential difference V). This makes the electrophoretic particles 139 concentrated near the louver element driving electrodes 126.

For example, when the electrophoretic particles 139 are charged negatively, and the louver element driving electrode 126 is positive, the electrophoretic particles 139 are concentrated near the louver element driving electrodes 126. Similarly, when the electrophoretic particles 139 are charged positively, and the louver element driving electrode 126 is negative, the electrophoretic particles 139 are concentrated near the louver element driving electrodes 126. The potential difference V needs to be about 20V to 25V, for example.

On the other hand, the relative potential of the louver element driving electrode 126 with respect to the opposite electrode 136 may have the same polarity as that of the electrical charge of the electrophoretic particles 139 (potential difference V). This makes the electrophoretic particles 139 concentrated near the opposite electrode 136. For example, when the electrophoretic particles 139 are charged negatively, and the louver element driving electrode 126 is negative, the electrophoretic particles 139 are concentrated near the opposite electrode 136. Similarly, when the electrophoretic particles 139 are charged positively, and the louver element driving electrode 126 is positive, the electrophoretic particles 139 are concentrated near the opposite electrode 136.

The louver 135 may have a different configuration from the above-described configuration where the electrophoretic particles 139 are contained in the dispersion medium 138. For example, the louver 135 may be configured so as to diffuse light in the narrow viewing angle mode. Also, the louver 135 may be constituted of an electrochromic material exhibiting the electrochromism, for example. The electrochromic material changes the amount of light to be transmitted depending on the applied voltage. This also applies to other embodiments.

Figure 3A:
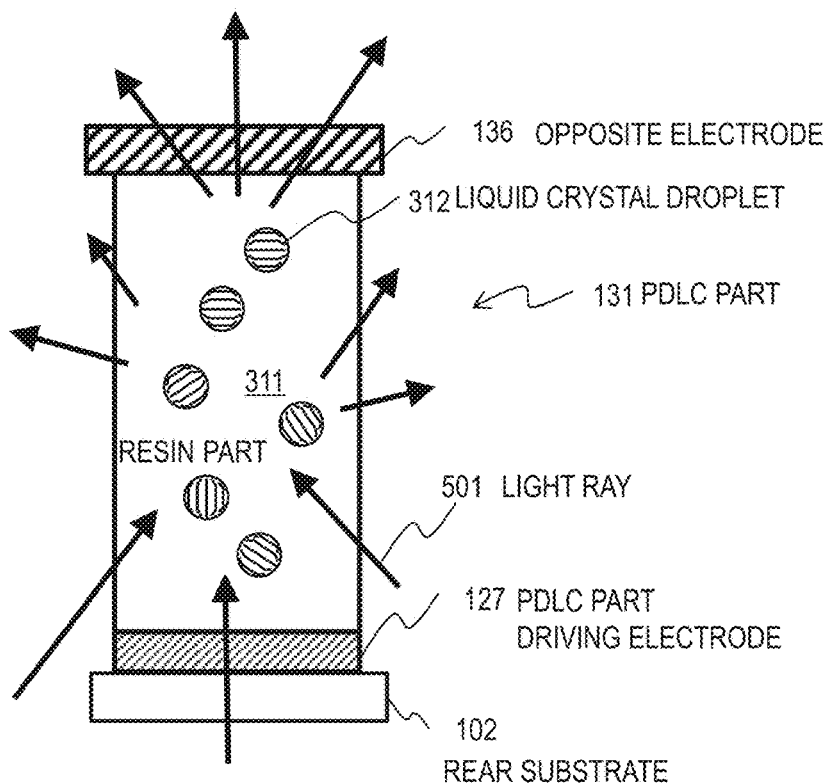
FIG. 3A illustrates the PDLC parts in the scattering state.
Figure 3B:
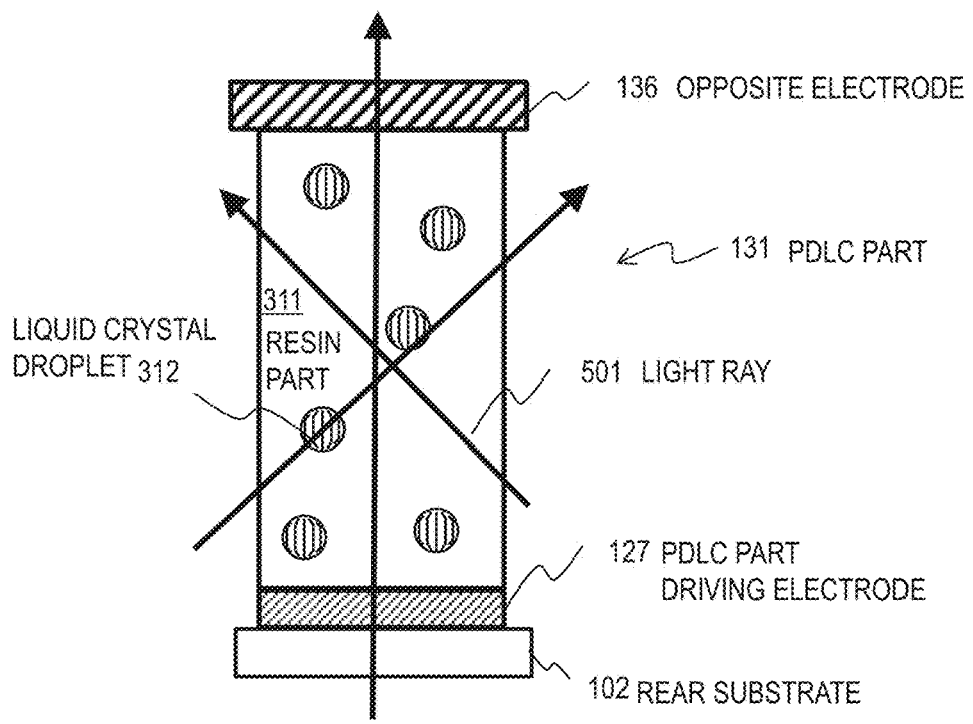
FIG. 3B illustrates the PDLC parts in the transparent state.

The configuration and state of the PDLC parts 131 will be explained with reference to FIGS. 3A and 3B. FIG. 3A illustrates the PDLC parts 131 in the scattering state, and FIG. 3B illustrates the PDLC parts 131 in the transparent state. The PDLC parts 131 each include a solid polymer resin part 311 and liquid crystal droplets 312 dispersed in the polymer resin part 311.

The polymer resin part 311 is polymer matrix or polymer network. An element constituted of the polymer network and liquid crystal droplets may also be referred to as PNLC (polymer network liquid crystal). In this specification, PDLC includes PNLC. The PDLC parts 131 (PDLC layer 130) are formed by exposing the mixture of photo-curable resin and a liquid crystal material to light for hardening, for example.

Each PDLC part 131 is sandwiched by a PDLC part driving electrode 127 and the opposite electrode 136. The orientation of the liquid crystal droplets 312 in the PDLC parts 131 changes depending on the voltage between the PDLC part driving electrode 127 and the opposite electrode 136. This changes the state of the PDLC parts with respect to the incident light.

When no voltage (electric field) is applied to the PDLC parts 131, the PDLC parts 131 are in the light scattering state as illustrated in FIG. 3A. The light that has entered the PDLC parts 131 (light ray 501) exits in the scattered state. This is because the liquid crystal molecules of the liquid crystal droplets 312 are irregularly arrayed, which causes the apparent refractive index of the polymer resin part 311 and the liquid crystal droplets 312 to differ from each other.

On the other hand, when a voltage (electric field) greater than a prescribed value is applied to the PDLC parts 131, the PDLC parts 131 are in the transparent state as illustrated in FIG. 3B. The light that has entered the PDLC parts 131 (light ray 501) passes through the PDLC parts 131 without being scattered. This is because the liquid crystal molecules of the liquid crystal droplets 312 are arrayed along the electric field direction, which causes the apparent refractive index of the polymer resin part 311 and the liquid crystal droplets 312 to substantially coincide with each other.

When the PDLC parts 131 are in the light scattering state, the spread angle of the light exiting from the PDLC parts 131 is greater than the spread angle of the light that has entered the PDLC parts 131. When the PDLC parts 131 are in the transparent state, the spread angle of the light exiting from the PDLC parts 131 is substantially the same as the spread angle of the light that has entered the PDLC parts 131.

The light that has entered the PDLC parts 131 is scattered or transmitted as is, and is emitted toward the liquid crystal display panel 200. The PDLC parts 131 are given an AC voltage to prevent burn-in of the liquid crystal droplets 132.

The PDLC parts 131 continuously changes the light scattering property (the degree of scattering or transmittance) in accordance with the value of applied voltage. The state of the PDLC parts 131 can change gradually from the transparent state to the scattering state, instead of switching between the two states illustrated in FIGS. 3A and 3B. Thus, it is possible to gradually change the spread angle of the exiting light from the spread angle of the incident light to the maximum angle by given appropriate voltages to the PDLC parts 131.

The PDLC parts 131 illustrated in FIGS. 3A and 3B are PDLC of the normal mode type. It is also possible to use PDLC of the reverse mode type. The PDLC of the reverse mode type is in the transparent state when no electric field is applied, and changes to the scattering state by receiving a voltage.

As described with reference to FIGS. 2A and 2B, the louver 135 can make the spread angle of the exiting light smaller than the spread angle of the incident light. On the other hand, the PDLC layer 130 can make the spread angle of the exiting light greater than the spread angle of the incident light. In the light ray direction controlling device 100 of this embodiment, those two functions are controlled independently of each other, and therefore, it is possible to realize both smaller and greater viewing angles than the viewing angle determined by the spread angle of the light from the backlight module 300.

Below, a plurality of viewing angle modes of the display device 10 (light ray direction controlling device 100) will be explained. The display device 10 of this embodiment has a plurality of viewing angle modes including the wide viewing angle mode, the narrow viewing angle mode, and the intermediate viewing angle mode.

Figure 4A:
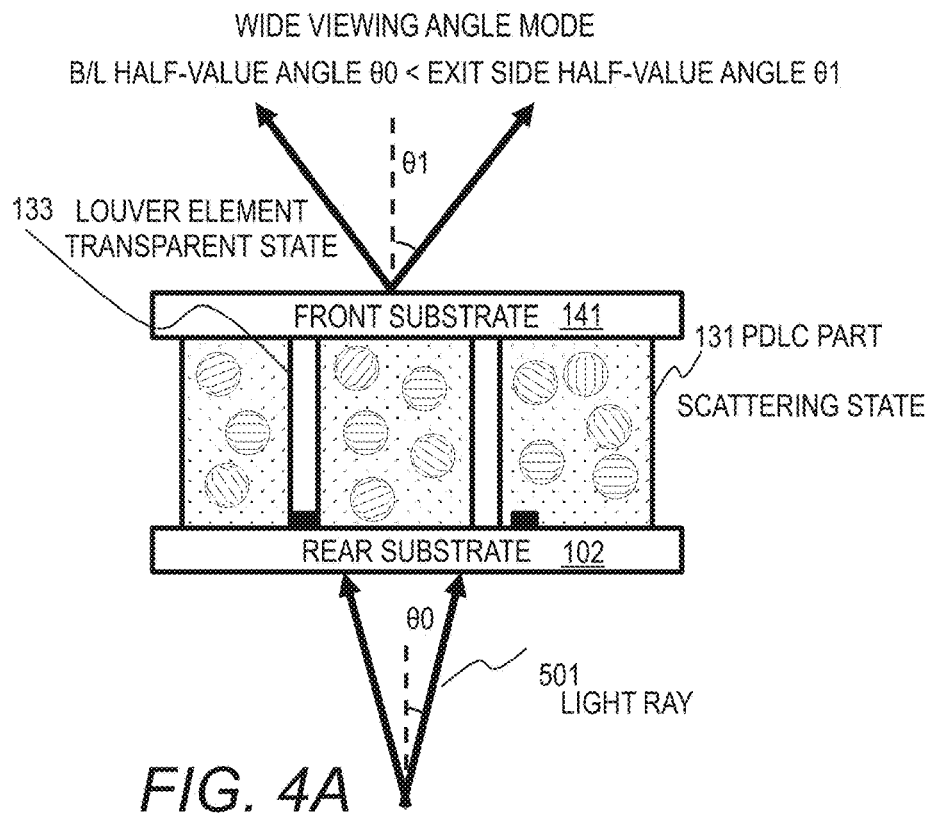
FIG. 4A illustrates the light ray direction controlling device in the wide viewing angle mode.
Figure 4B:
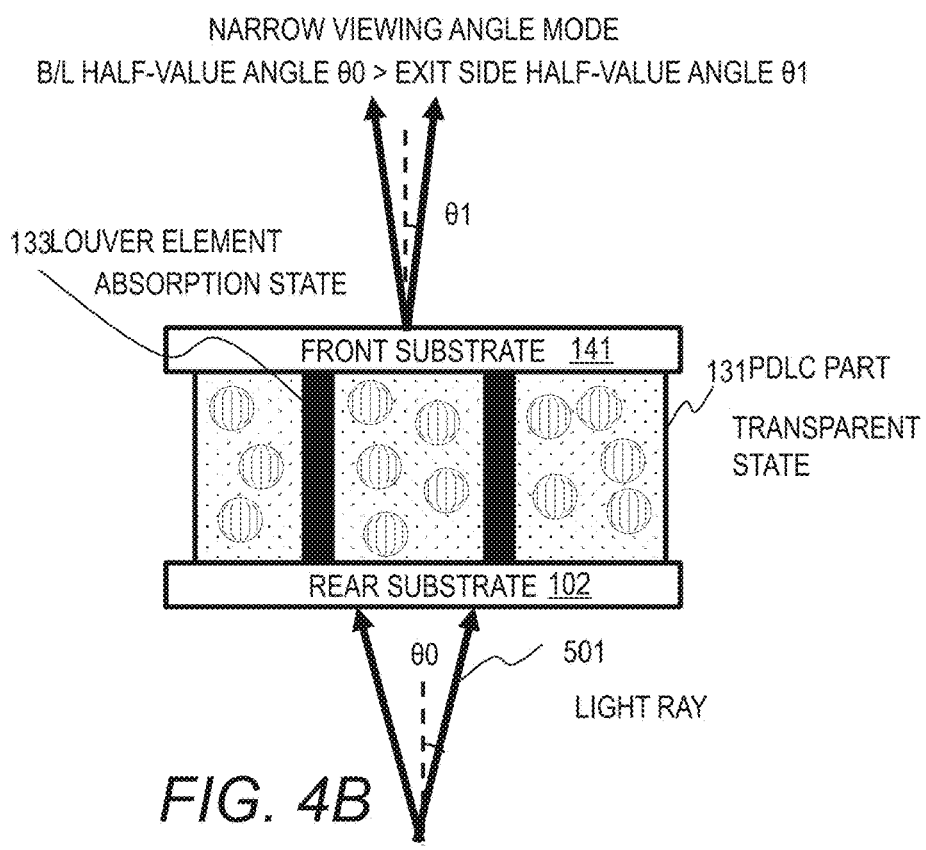
FIG. 4B illustrates the light ray direction controlling device in the narrow viewing angle mode.
Figure 4C:
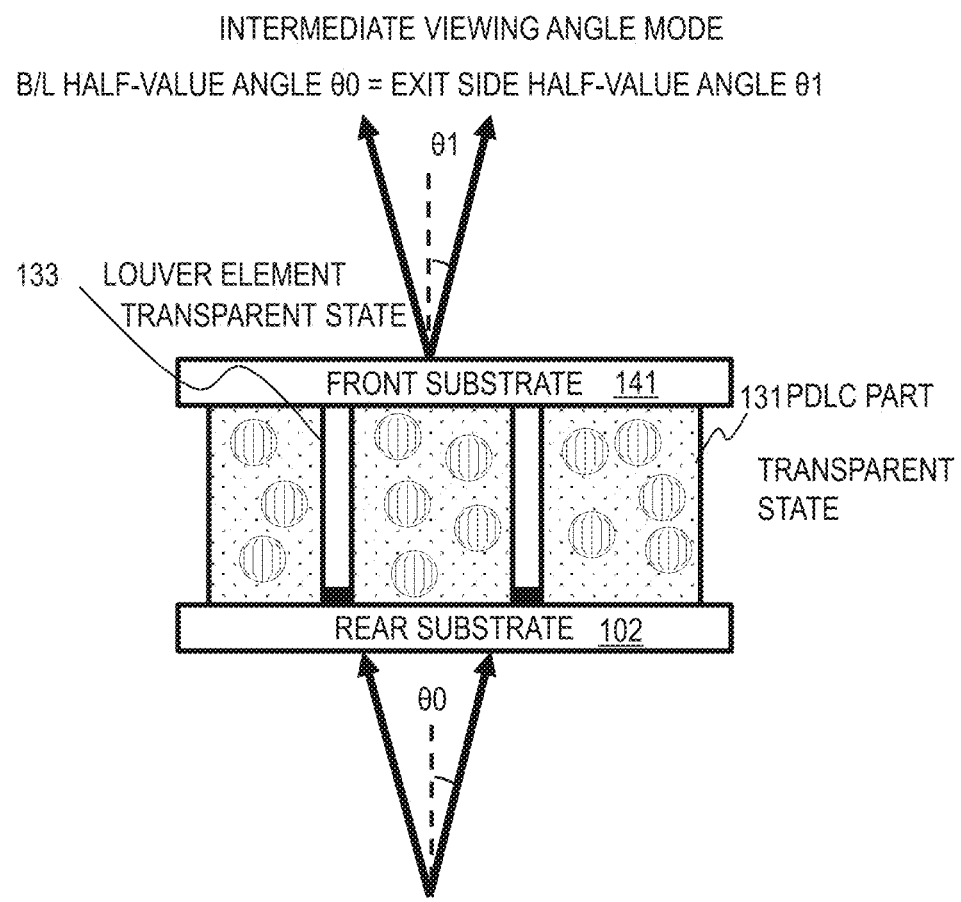
FIG. 4C illustrates the light ray direction controlling device in the intermediate viewing angle mode.

FIGS. 4A to 4C illustrate the relationship between the viewing angle mode and the respective states of the louver 135 and the PDLC layer 130. FIG. 4A illustrates the light ray direction controlling device 100 in the wide viewing angle mode, FIG. 4B illustrates the light ray direction controlling device 100 in the narrow viewing angle mode, and FIG. 4C illustrates the light ray direction controlling device 100 in the intermediate viewing angle mode. In FIGS. 4A to 4C, the electrodes 126, 127, or 136 are omitted.

As illustrated in FIG. 4A, in the wide viewing angle mode, the louver 135 (louver elements 133) is in the transparent state, and the PDLC layer 130 (PDLC parts 131) is in the light scattering state. The light from the backlight module 300 is scattered by the PDLC layer 130 and passes through the louver 135.

Therefore, in the wide viewing angle mode, the spread angle of the exiting light from the light ray direction controlling device 100 is wider than the spread angle of the light from the backlight module 300. Specifically, the half-value angle θ1 of the exiting light from the light ray direction controlling device 100 is greater than the half-value angle θ0 of the light from the backlight module 300.

The wide viewing angle mode is useful when a plurality of users view the screen of the display device 10 at the same time. For example, the wide viewing angel mode is useful when a presentation is to be performed while a tablet PC including the display device 10 is placed on a desk, and a plurality of users look at the screen from different directions.

As illustrated in FIG. 4B, in the narrow viewing angle mode, the louver 135 (louver elements 133) is in the light absorption state, and the PDLC layer 130 (PDLC parts 131) is in the transparent state. The light from the backlight module 300 passes through the PDLC layer 130. Among the light from the backlight module 300, light having a great emission angle is absorbed (blocked) by the louver 135.

Therefore, in the narrow viewing angle mode, the spread angle of the exiting light from the light ray direction controlling device 100 is narrower than the spread angle of the light from the backlight module 300. Specifically, the half-value angle θ1 of the exiting light from the light ray direction controlling device 100 is smaller than the half-value angle θ0 of the light from the backlight module 300.

In the narrow viewing angle mode, light is output toward the front side only. This makes it possible to prevent strangers near the user from viewing the displayed images.

As illustrated in FIG. 4C, in the intermediate viewing angle mode, the louver 135 (louver elements 133) is in the transparent state, and the PDLC layer 130 (PDLC parts 131) is also in the transparent state. The light from the backlight module 300 passes through both the PDLC layer 130 and the louver 135.

Therefore, in the intermediate viewing angle mode, the spread angle of the exiting light from the light ray direction controlling device 100 coincides with the spread angle of the light from the backlight module 300. Specifically, the half-value angle θ1 of the exiting light from the light ray direction controlling device 100 is equal to the half-value angle θ0 of the light from the backlight module 300.

The intermediate viewing angle mode is useful when a user views the screen from a diagonal direction. In the intermediate viewing angle mode, the light from the backlight module 300 passes through the light ray direction controlling device 100 as is, and therefore, the utilization efficiency of the light of the backlight module 300 can be maximized.

As described above, the light scattering property of the PDLC layer 130 changes continuously with respect to the applied voltage, instead of switches between two values. That is, the state of the PDLC layer 130 with respect to the incident light can gradually change from the transparent state to the maximum scattering state. Therefore, the light ray direction controlling device 100 can gradually change the spread angle of the exiting light between the wide viewing angle mode of FIG. 4A and the intermediate viewing angle mode of FIG. 4C. As described above, the light ray direction controlling device 100 may have a plurality of intermediate viewing angle modes having different spread angles of the exiting light.

As described above, the light ray direction controlling device 100 can be used for different situations such as simultaneous viewing by multiple people, individual use, and private use, by changing the viewable range using one backlight unit. By using the light-concentrating backlight module as described above, it is possible to reduce the amount of light absorbed by the louver 135 in the narrow viewing angle mode and suppress heat generation. It is also possible to suppress a reduction in light intensity in the front direction.

Figure 5A:
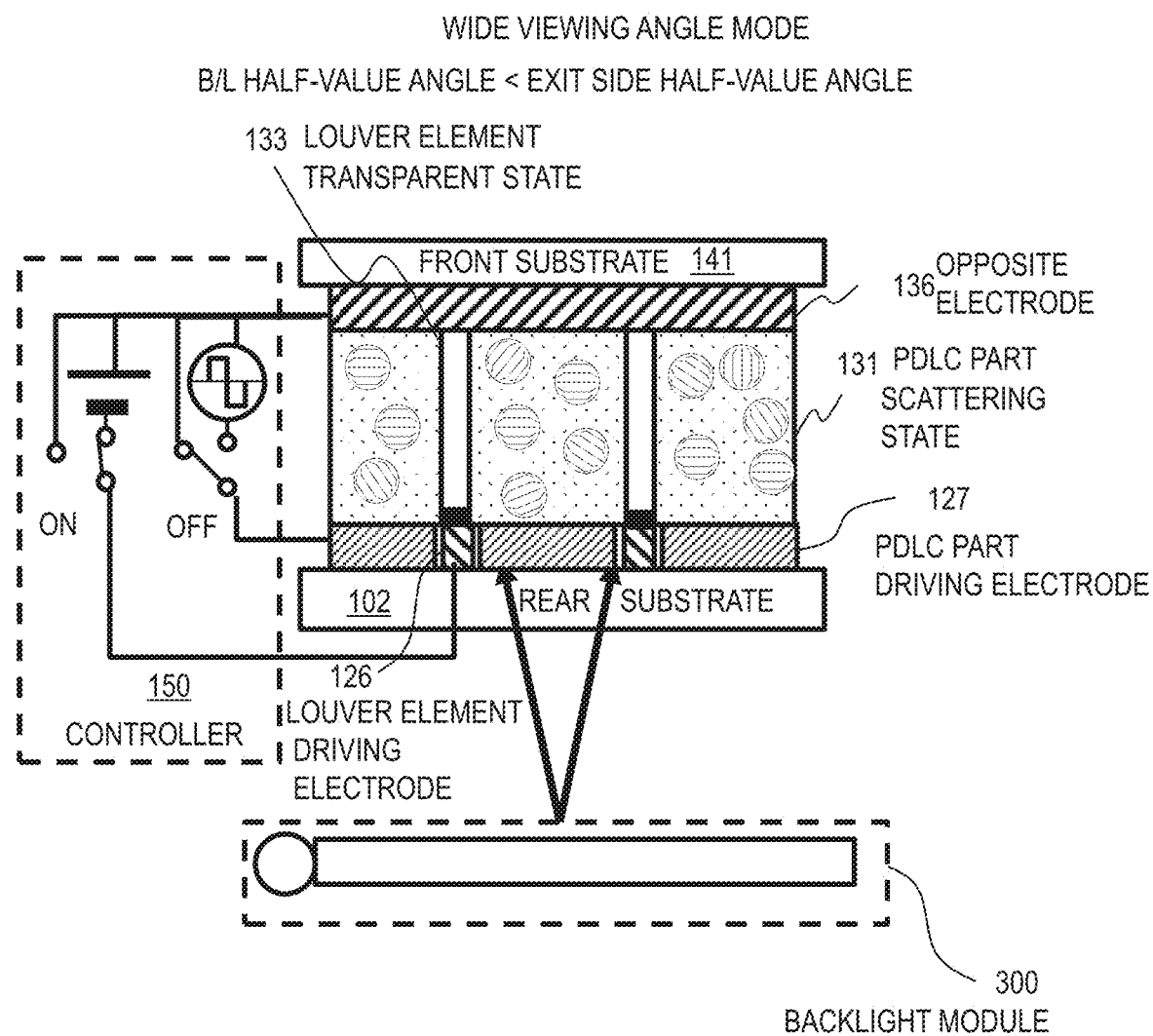
FIG. 5A illustrates the control of the light ray direction controlling device in the wide viewing angle mode.

Below, with reference to FIGS. 5A to 5C, a control method (driving method) of the light ray direction controlling device 100 in each of the viewing angle modes, which were described with reference to FIGS. 4A to 4C, will be described. FIG. 5A illustrates the control of the light ray direction controlling device 100 in the wide viewing angle mode. The controller 150 gives a constant voltage greater than zero to the louver 135 (the louver elements 133), and maintains the no electric field state (no voltage state) of the PDLC layer 130 (the PDLC parts 131).

Specifically, the controller 150 gives the opposite electrode 136 a constant reference potential, and gives the louver element driving electrode 126 a driving voltage differs from the reference voltage by a prescribed voltage. The controller 150 gives the PDLC part driving electrode 127 the reference potential. This way, the louver 135 enters the transparent state, and the PDLC layer 130 enters the light scattering state. The opposite electrode 136 and the louver element driving electrode 126 may be equipotential (shorted) or opened so as not to generate an electric field between the two electrodes.

Figure 5B:
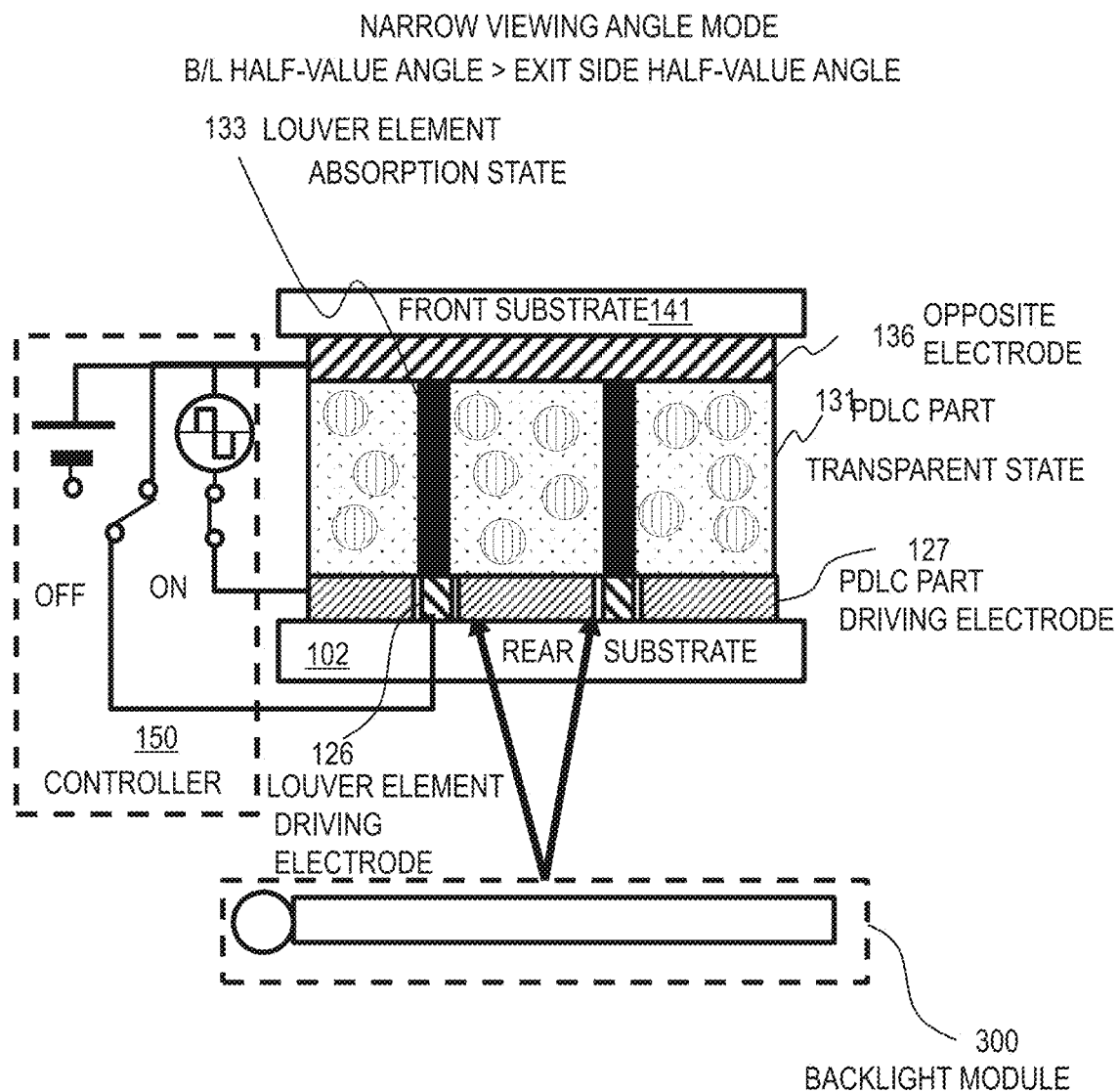
FIG. 5B illustrates the control of the light ray direction controlling device in the narrow viewing angle mode.

FIG. 5B illustrates the control of the light ray direction controlling device 100 in the narrow viewing angle mode. The controller 150 maintains the no electric field (no voltage) state of the louver 135 (louver elements 133). The controller 150 gives the PDLC layer 130 (PDLC parts 131) an AC electric field (AC voltage).

Specifically, the controller 150 gives the opposite electrode 136 a constant reference potential, and gives the reference potential to the louver element driving electrode 126. The controller 150 gives the PDLC part driving electrode 127 an AC voltage corresponding to the reference potential. The frequency of the AC voltage is several tens of Hz, for example, and the amplitude is several tens of V, for example. This way, the louver 135 enters the light absorption state, and the PDLC layer 130 enters the transparent state.

Figure 5C:
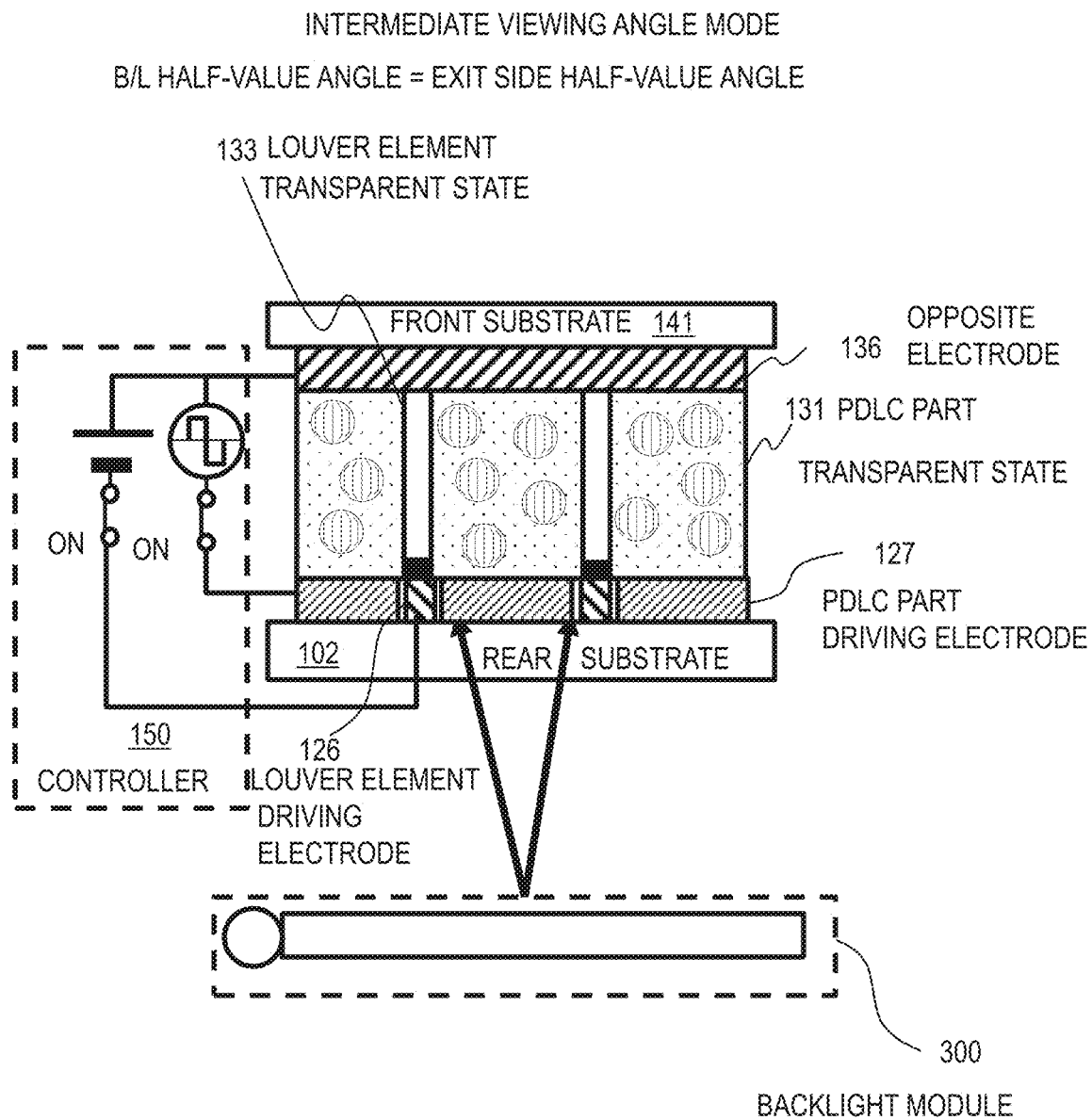
FIG. 5C illustrates the control of the light ray direction controlling device in the intermediate viewing angle mode.

FIG. 5C illustrates the control of the light ray direction controlling device 100 in the intermediate viewing angle mode. The controller 150 gives the louver 135 (louver elements 133) a constant voltage greater than zero, and gives the PDLC layer 130 (PDLC parts 131) an AC electric field (AC voltage).

Specifically, the controller 150 gives the opposite electrode 136 a constant reference potential, and gives the louver element driving electrode 126 a driving voltage differs from the reference voltage by a prescribed voltage. The controller 150 gives the PDLC part driving electrode 127 an AC voltage corresponding to the reference potential. This makes both the louver 135 and the PDLC layer 130 enter the transparent state.

The controller 150 switches the viewing angle mode in accordance with the user input via an interface that is not illustrated in the figure. As described above, the controller 150 may provide intermediate viewing angle modes with different viewing angles in accordance with the user input. The controller 150 adjusts the amplitude of the AC voltage given to the PDLC layer 130 depending on the user input. When the amplitude of the AC voltage is made greater, the viewing angle is narrower. For example, the controller 150 stores therein information associating each user input to an amplitude of the AC voltage, and use such information to determine the amplitude of the AC voltage.

Another Embodiment

Figure 6:
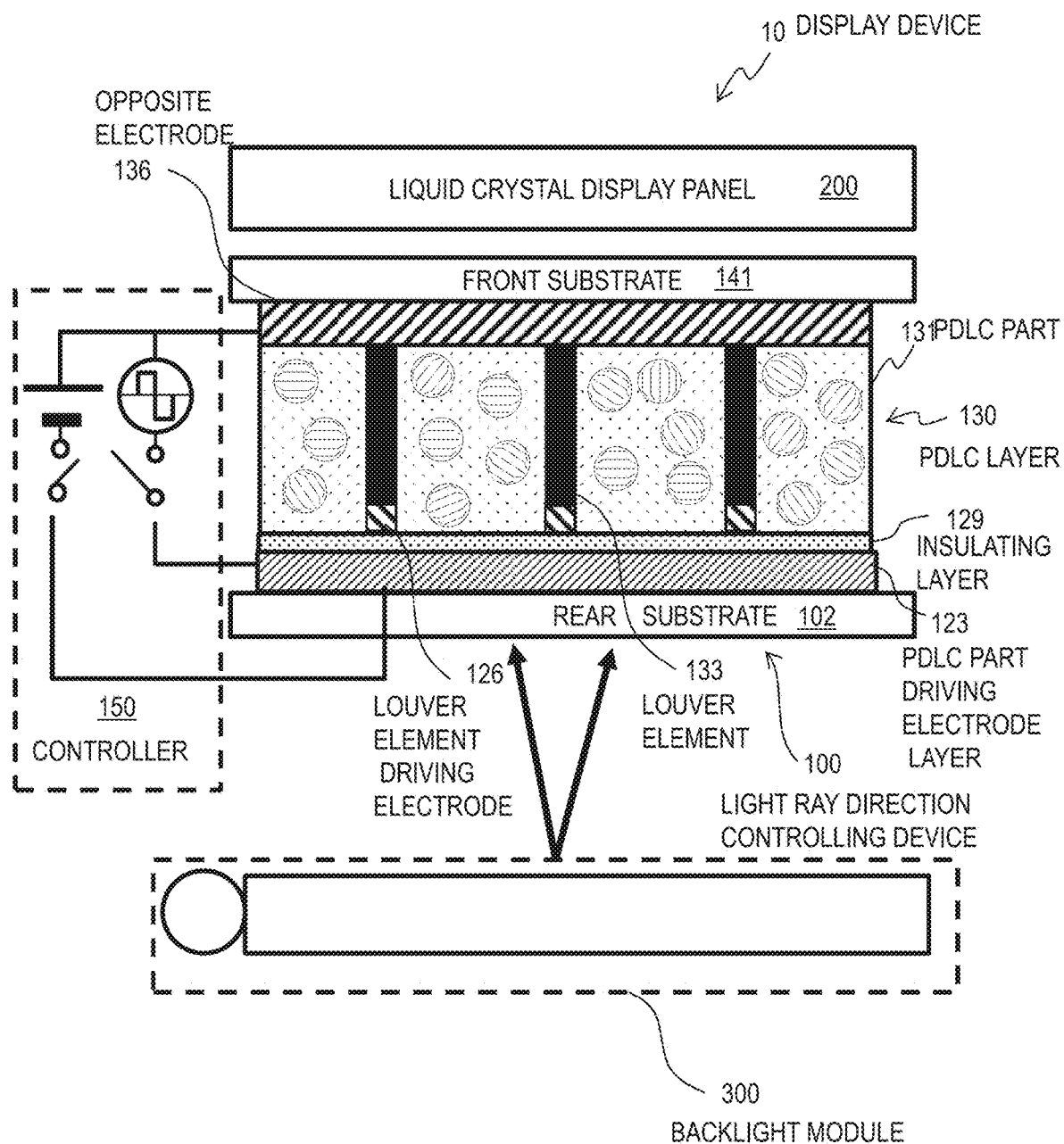
FIG. 6 illustrates another configuration example of the light ray direction controlling device.

FIG. 6 illustrates another configuration example of the light ray direction controlling device 100. Below, differences between this example and the configuration example illustrated in FIG. 1B will be mainly discussed. A PDLC part driving electrode layer 123 is disposed between the louver element driving electrode 126 and the rear substrate 102. An insulating layer 129 is disposed between the PDLC part driving electrode layer 123 and the louver element driving electrode 126.

The PDLC part driving electrode layer 123 faces the PDLC parts 131, as well as the louver elements 133 (louver 135). That is, in a plan view, the louver 135 overlaps with the PDLC part driving electrode layer 123. The PDLC part driving electrode layer 123 is a continuous planar conductor layer, and the PDLC part driving electrode for one PDLC part 131 is a portion of the PDLC part driving electrode layer 123, the portion facing the PDLC part 131.

As described above, since the driving voltage of the PDLC layer 130 is an AC signal of a frequency at which the louver 135 does not respond, even if the PDLC part driving electrode layer 123 and the louver 135 overlap with each other, such a configuration has substantially no effect on the operation of the louver 135. By the PDLC part driving electrode layer 123, which is a continuous conductor layer, the respective driving electrodes for the PDLC parts can be formed efficiently. The driving method of the PDLC part driving electrode layer 123 is the same as that in FIG. 1B.

Below, an example of the manufacturing method of the light ray direction controlling device 100 will be explained. The PDLC layer can be prepared by microencapsulating the liquid crystal and dispersing the microcapsules in a photosensitive resin. For example, the complex coacervation technique can be used. Specifically, nematic liquid crystal having a positive dielectric anisotropy is mixed in a hydrophilic solution based on gelatin and gum arabic, the mixture is stirred until it forms droplets of about several μm, and then a curing agent is added so as to form a solid film on the droplet surface.

Thereafter, the microcapsules prepared in the manner described above are added and dispersed in the photosensitive resin, and the mixture is coated on a glass substrate with a thickness of several tens of micrometers, and thereafter a light exposure process is conducted so that a groove is formed in a grid-like shape or with a stripe pattern. The width of the groove needs to be large enough for the microcapsules to be discharged sufficiently. This way, the PDLC layer is formed on the glass substrate. Thereafter, the substrate with the PDLC layer and another glass substrate are put together, and an electrophoretic material is injected into the groove of the PDLC layer.

Below, another example of the manufacturing method of the light ray direction controlling device 100 will be explained. The PDLC layer may be formed by using the polymer dispersed liquid crystal element. Specifically, a mixture liquid containing UV-curable resin and nematic liquid crystal with the positive dielectric anisotropy is injected into a cell made of two transparent substrates having a gap therebetween.

The mixture liquid including the UV-curable resin is photo-cured so as to have a grid-like part or stripe part that is not exposed to light. Thereafter, one of the substrates is removed, the unexposed part is washed, and a groove is formed in the PDLC layer. Then, a transparent glass substrate is placed over the PDLC layer, and the electrophoretic material is injected into the groove in the PDLC layer.

As set forth above, embodiments of the present disclosure have been described; however, the present disclosure is not limited to the foregoing embodiments. Those skilled in the art can easily modify, add, or convert each element in the foregoing embodiment within the scope of the present disclosure. A part of the configuration of one embodiment can be replaced with a configuration of another embodiment or a configuration of an embodiment can be incorporated into a configuration of another embodiment.

What is claimed is:

1. A light ray direction controlling device that can change a range of an emission angle of light that is incident on a light incident surface and exits from a light exiting surface, the light ray direction controlling device comprising:
 a substrate;
 a plurality of louver elements arranged along a primary surface of the substrate, the louver elements each rising up in a direction from the light incident surface toward the light exiting surface, the louver elements each extending along the primary surface of the substrate and switching between a transparent state and a light absorption state in accordance with an applied voltage;
 a plurality of polymer dispersed liquid crystal parts arranged along the primary surface of the substrate between the plurality of louver elements, respectively, the polymer dispersed liquid crystal parts each including a solid polymer resin part and liquid crystal drops dispersed in the solid polymer resin part, the polymer dispersed liquid crystal parts each changing a degree of scattering of exiting light by changing a degree of scattering of incident light in accordance with an applied voltage;
 a plurality of pairs of polymer dispersed liquid crystal part driving electrodes each arranged so as to sandwich one of the polymer dispersed liquid crystal parts and giving a driving voltage to the sandwiched one of the polymer dispersed liquid crystal parts; and
 a plurality of pairs of louver element driving electrodes each arranged so as to sandwich one of the plurality of louver elements and giving a driving voltage to the sandwiched one of the plurality of louver elements.

2. The light ray direction controlling device according to claim 1, wherein each of the plurality of louver elements includes a transparent dispersion medium and colored electrophoretic particles.

3. The light ray direction controlling device according to claim 1, wherein the driving voltage given by each of the plurality of pairs of louver element driving electrodes is a DC voltage, and wherein the driving voltage given by each of the plurality of pairs of polymer dispersed liquid crystal part driving electrodes is a AC voltage.

4. The light ray direction controlling device according to claim 1, wherein the plurality of pairs of louver element driving electrodes each include a first electrode and a second electrode, and wherein the first electrode faces a corresponding louver element, and does not face any of the plurality of polymer dispersed liquid crystal parts.

5. The light ray direction controlling device according to claim 4, where the plurality of pairs of polymer dispersed liquid crystal part driving electrodes each include a third electrode and a fourth electrode, wherein the third electrode is a portion of one continuous conductor layer, wherein the first electrode is disposed between said conductor layer and the corresponding louver element, and wherein an insulating layer is disposed between the first electrode and the conductor layer.

6. The light ray direction controlling device according to claim 1, where the plurality of pairs of louver element driving electrodes each include a first electrode and a second electrode, and where the plurality of pairs of polymer dispersed liquid crystal part driving electrodes each include a third electrode and a fourth electrode, and wherein the second electrode and the fourth electrode are each a portion of one continuous conductor layer.

7. The light ray direction controlling device according to claim 6, further comprising a controller, wherein the plurality of louver elements each include a plurality of states including a transparent state and a light absorption state, wherein the plurality of polymer dispersed liquid crystal parts each include a plurality of states including a transparent state and a scattering state, and wherein the controller is configured to:

give a constant reference potential to the conductor layer;

give, to the first electrode, a constant potential corresponding to one of the plurality of states of the plurality of louver elements; and give, to the third electrode, the reference potential or an AC potential with respect to the reference potential, corresponding to one of the plurality of states of the plurality of polymer dispersed liquid crystal parts.

8. The light ray direction controlling device according to claim 1, further comprising a controller that controls the plurality of polymer dispersed liquid crystal parts and the plurality of louver elements in a plurality of viewing angle modes, wherein the controller is configured to:

in a wide viewing angle mode, maintain the plurality of louver elements in a transparent state, and maintain the plurality of polymer dispersed liquid crystal parts in a light scattering state; and in a narrow viewing angle mode, maintain the plurality of louver elements in a light absorption state, and maintain the plurality of polymer dispersed liquid crystal parts in a transparent state.

9. The light ray direction controlling device according to claim 8, wherein the controller is configured to:

in an intermediate viewing angle mode, maintain the plurality of louver elements in a transparent state, and maintain the plurality of polymer dispersed liquid crystal parts in a transparent state.

10. The light ray direction controlling device according to claim 8, wherein the plurality of viewing angle modes include a plurality of intermediate viewing angle modes having different viewing angles, and wherein the controller is configured to, in the plurality of intermediate viewing angle modes, maintain the plurality of louver elements in a transparent state, and give AC voltages of different amplitudes to the plurality of polymer dispersed liquid crystal parts.

11. A display device, comprising:

a display panel;

a backlight module that emits planar light; and a light ray direction controlling device that is disposed between the backlight module and the display panel, the light ray direction controlling device changing a range of an emission angle of light that is incident on a light incident surface and that exits from a light exiting surface, wherein the light ray direction controlling device includes:

a substrate;

a plurality of louver elements arranged along a primary surface of the substrate, the louver elements each rising up in a direction from the light incident surface toward the light exiting surface, the louver elements each extending along the primary surface of the substrate and switching between a transparent state and a light absorption state in accordance with an applied voltage;

a plurality of polymer dispersed liquid crystal parts arranged along the primary surface of the substrate between the plurality of louver elements, respectively, the polymer dispersed liquid crystal parts each including a solid polymer resin part and liquid crystal drops dispersed in the solid polymer resin part, the polymer dispersed liquid crystal parts each changing a degree of scattering of exiting light by changing a degree of scattering of incident light in accordance with an applied voltage;

a plurality of pairs of polymer dispersed liquid crystal part driving electrodes each arranged so as to sandwich one of the polymer dispersed liquid crystal parts and giving a driving voltage to the sandwiched one of the polymer dispersed liquid crystal parts; and a plurality of pairs of louver element driving electrodes each arranged so as to sandwich one of the plurality of louver elements and giving a driving voltage to the sandwiched one of the plurality of louver elements.

* * * * *